United States Patent Office 3,362,270
Patented Jan. 9, 1968

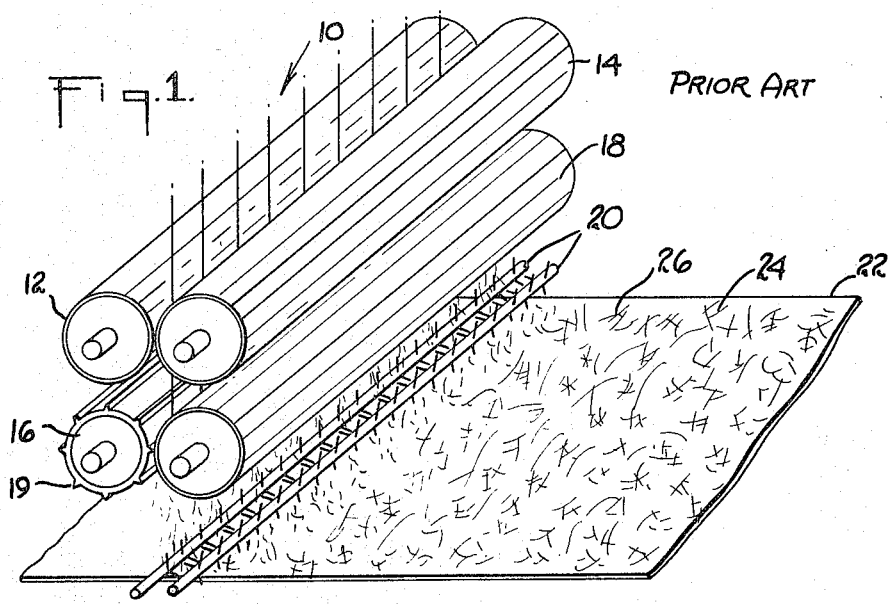
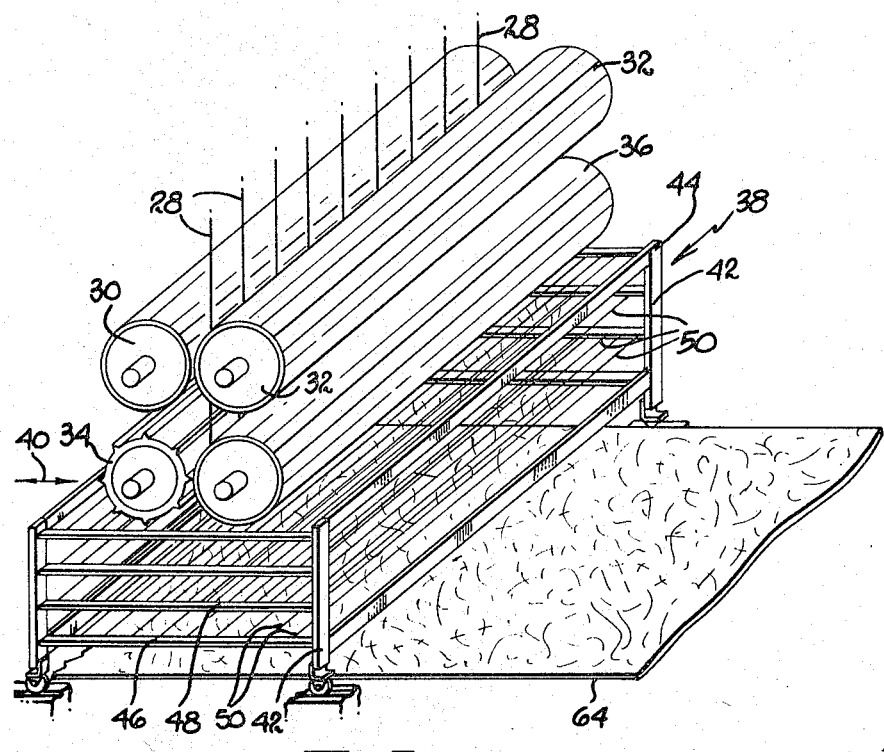

3,362,270
METHOD AND APPARATUS FOR SPREADING CHOPPED FIBERS
William Anthony Meath and James Lambert Neill, Houston, Tex., assignors to Johns-Manville Corporation, New York, N.Y., a corporation of New York
Filed Dec. 30, 1965, Ser. No. 517,565
10 Claims. (Cl. 83—27)

ABSTRACT OF THE DISCLOSURE

Disclosed are a method and apparatus for cutting fibrous material and distributing the cut fibers to form a uniform non-woven layer. The material is cut by rotary cutters and the cut fibers fall through a plurality of thin, taut, resilient elongated members while the members are being reciprocated in a direction transverse to their length.

---

This invention relates to the cutting and distribution of fibrous material used to form a uniform non-woven layer of fibers. More particularly, it relates to the opening or separating of the individual fibers in short lengths of chopped rovings, and to the distributing of the individual fibers to form a uniform non-woven layer.

In the manufacture of glass fiber roving a large number, in the order of several hundred, of individual glass fibers are adhered together by sizing material to form a strand known as an "end," and a number of ends in turn are adhered together by suitable sizing material to form a roving. One of the uses of glass fiber rovings is as a source of glass fibers used to form a reinforcing layer or mat in the manufacture of reinforced resin panels. While such panels can be reinforced with ready-formed, bonded glass fiber mats, it is preferable in many cases to reinforce them with a layer of non-woven, non-oriented uniformly distributed glass fibers. A conventional prior art method of distributing fibers in forming a uniform layer is to chop the fibers into desired lengths, in the order of about two inches, and to disperse and distribute them by means of rotary beaters located beneath the rotary cutting rolls and rotating through the mass of fibrous material dropping from the cutting rolls. A typical beater arrangement consists of a pair of parallel shafts rotating in opposite directions and carrying a number of spaced radially extending rods or spikes which sharply engage the roving materials, acting to separate the fibers and distribute them on the support below. This type of beater apparatus is effective to a certain degree, but often difficulty is encountered in opening or separating the fibers from the ends and also in separating the ends from the rovings. In addition, rovings sometimes wrap around the rotary beaters and entrap other fibers, causing a build-up of fibers with resulting poor fiber distribution. Thus, even though the rotary beater apparatus might distribute on the surface beneath it material it encounters dropping from the cutting rolls, the layer of fibrous material thus formed often includes clumps of glass fibers which have not been separated properly. Such clumps of fibers are detrimental to both the appearance and the weatherability of the resinous panel of which they become a part. Rotary beaters also require much maintenance because the radial rods or spikes have to be replaced frequently and the beaters often have to be cleaned to remove entrapped fibers.

It is an object of the present invention to provide an improved method of separating glass fibers from ends and rovings, and to distribute the glass fibers in a uniform, non-woven, non-oriented layer.

Another object of the invention is to provide a simple, inexpensive apparatus for carrying out the above method in an efficient manner.

The above objects have been achieved by reciprocating a plurality of taut, thin, resilient elongated members transversely through a mass of falling glass fiber rovings and ends to contact them as many times as possible before they reach the surface on which they are to be deposited. This action tends to open the ends and separate the individual fibers from them and, at the same time, to distribute the fibers uniformly, although not oriented with respect to each other, on the surface below.

The nature of the invention will be more fully understood and other objects may become apparent when the following detailed description is considered in connection with the accompanying drawing, wherein:

FIG. 1 is a pictorial representation of the prior art method of cutting glass fiber rovings and distributing the glass fibers on a support;

FIG. 2 is a pictorial representation of the apparatus of the present invention for separating the fibers from the ends and rovings and uniformly distributing the individual fibers on a support;

Figure 3:
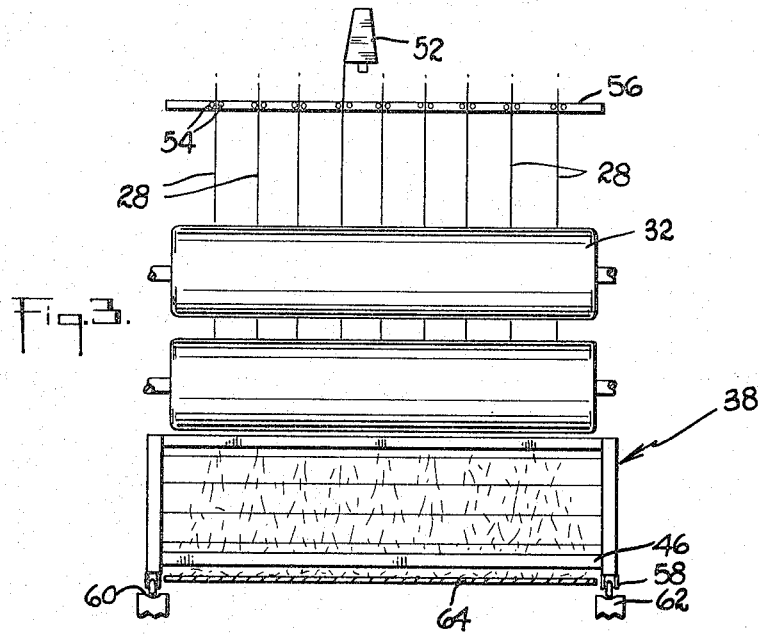
FIG. 3 is an end view of the apparatus shown in FIG. 2, but showing more details of the structure.

Referring to FIG. 1, a number of glass fiber rovings 10 are illustrated as being pulled downwardly from a supply source by rotating feed rolls 12 and 14. Conventionally, one of the feed rolls 12 has a steel surface while the other roll 14 is covered with rubber to induce friction between the rolls and the glass rovings. Mounted for rotation beneath the feed rolls 12 and 14 are cutting rolls 16 and 18, the cutting roll 16 having a number of radially extending knives 19 running the length of the roll, the knives being adapted to engage the roving and press it against the rubber covered roll 18 to such an extent and around a sufficiently small radius so as to cause fiber breakage. An example of this type of knife is 0.010 inch razor blade stock.

As the roving falls from the nip of the cutting rolls 16 and 18, it is engaged by rotating beaters 20 which act to forcefully strike the roving and clumps of fibers to separate them to a degree and deposit them in a somewhat uniform manner on the support base 22 below. In actual practice, the support base is a moving continuous belt and the formed layer of fibrous material 24 continually moves away from the area of the rotary beaters. As shown in FIG. 1, the rotary beaters often do not function to completely separate the fibrous clumps into separate fibers as the clumps emerge from the cutting rolls. Such clumps often can be seen, as illustrated by reference numeral 26, in random locations of the mat 24.

Referring to FIG. 2, which shows a typical arrangement of the invention, glass fiber rovings 28 are pulled from their supply source by feed rolls 30 and 32 and are caused to pass through the nip of cutting rolls 34 and 36. The feed rolls and cutting rolls are identical to those illustrated and described in connection with FIG. 1. Instead of striking the glass fiber rovings as they emerge from the nip of the cutting rolls with a rotary beater the present invention provides a frame 38 which is reciprocated, as indicated by the arrow 40, transversely of the direction in which the cut glass fiber rovings are falling. The frame 38 is illustrated as having vertical corner members 42 connected by horizontal frame members 44 and 46 extending at right angles to each other. The resulting structure resembles an open framework of box-like configuration. Spaced between the frame members 46, which extend in the direction of movement of the continuous belt on which the glass fibers are deposited, are several spaced members 48 which also connect the upright corner members 42 and are parallel to the support members 46. These members 48 support the ends of taut, resilient elongated members 50 which are thus arranged on the frame in several layers. Typically such a member is a stretched elastic band, one specific example of which is a neoprene strip about 0.10 inch by 0.25 inch in cross section, which exhibits an excellent combination of strength and resiliency. Other materials may be used if desired, so long as they are relatively thin and are sufficiently resilient. Small gauge wire, however, did not perform well due to insufficient flexibility and resiliency.

Figure 4:
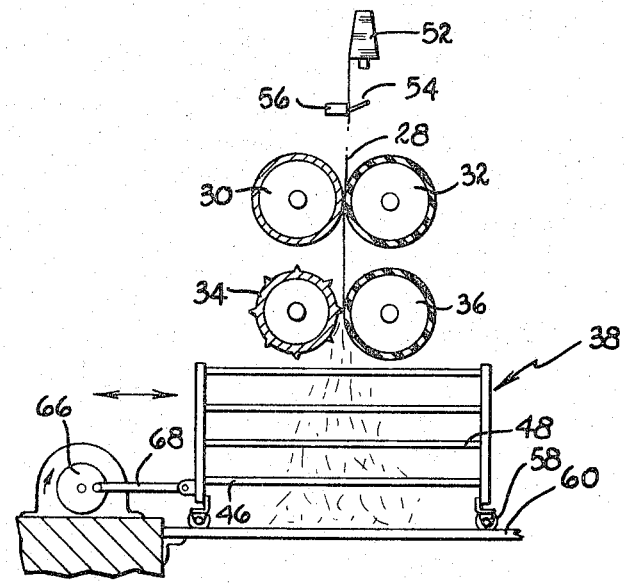
FIG. 4 is a side elevation of the apparatus shown in FIG. 3.

Referring to FIGS. 3 and 4, the glass fiber rovings are drawn from a spool or reel 52, only one of which is shown for the sake of simplicity, by being pulled vertically downwardly by the feed rolls 30 and 32. The rovings are maintained in their desired alignment by being passed between adjacent pins 54 of a row of pins equally spaced along a support bar 56. The frame 38 is illustrated as having wheels 58 or other friction reducing structure attached to the lowermost supports 46. The wheels 58 are engaged with tracks 60 mounted on suitable structure 62. The tracks extend in the same direction as the continuously moving belt 64 but are located beyond the side edges of the belt so as not to interfere with movement of the belt. One illustrative manner of reciprocating the frame along the track 60 is illustrated in FIG. 4, which shows a rotating crank wheel 66 and a crank arm 68 pivotally attached to both the crank wheel 66 and the frame 38.

In operation, referring to FIGS. 2, 3 and 4, the glass fiber rovings are drawn from the reels 52 by the feed rolls 30 and 32 which are spaced closely enough to have a compressing action on the glass fiber roving, thus functioning to spread the rovings somewhat so that by the time they are cut by the cutting rolls 34 and 36, some opening of the glass fiber ends will already have occurred. The degree to which this initial opening of the ends occurs depends upon the spacing of the feed rolls, which, of course, can be adjusted. The lengths of the cut segments of roving depend upon the speed of the feed rolls, the speed of the cutting rolls, and the spacing between adjacent knife blades. A typical length of roving as it leaves the nip of the cutting rolls is about 2 inches. The rovings, some intact and some partially opened into their fibrous ends, drop downwardly through the oscillating frame 38 and are struck by the bands 50 of the uppermost layer of bands. The engagement between a band and a fibrous clump or roving is relatively sharp, effecting at least some separation of fibers. The bands do not hurl the fibrous material any great distance out of the range of the frame but merely open the fibers somewhat and move the fibrous material at right angles to its descent to be in position for engaging another of the bands in that layer. This striking and rebounding action is repeated until the rovings and ends are struck by the bands in the several layers and are substantially fully separated into the individual fibers which are uniformly deposited, in non-oriented fashion, on the moving support beneath the oscillating frame.

The number of layers of bands may vary, but more than one is required to ensure that each length of roving is struck at least once, and preferably a number of times, as it falls. This striking action assures separation of the ends into their individual fibers and is necessary for the formation of a uniform layer of non-oriented fibers. The spacing of the bands may vary according to the length of the fiber and the uniformity required for the fibrous layer. If the spacing is too great, too many fibers will fall through the oscillating frame without being struck by a horizontal band. If the spacing is too narrow, fibers tend to build up on the bands, disrupting the uniform descent of the fibers and causing them to fall off in clumps.

The frame should move fast enough to prevent the fibrous material from falling through to the support without being struck by a horizontal band, or at least struck with sufficient force to assure a high degree of fiber separation. If the speed is too high, however, the fibers tend to be thrown too far, preventing multiple contact and causing them to clump. Also, high speeds create air currents which disrupt uniform distribution of the fibrous material.

Obviously, it is not practical to place strict limitations on the parameters of speed and spacing of the bands. At the same time, these variables should be selected so that the type of fibrous layer desired is best produced, taking into account the trouble areas mentioned above. As far as the typical arrangement of the oscillating frame is concerned, it is preferred to use taut neoprene bands, 0.10 inch by 0.25 inch in cross-section, spaced apart two inches and arranged in three layers. The most expedient way to determine the best operating speed is to vary the speed of the frame until the opening and deposition of fibers is satisfactory.

While the frame is illustrated as being oscillated in the direction of movement of the continuous belt, obviously it could be oscillated transversely of the direction of movement of the belt so long as it remains transverse to the direction of movement of the roving material as it drops from the nip of the cutting rolls. It is preferred that it be oscillated in the direction illustrated however, because oscillation transversely of the direction of movement of the conveyor tends to throw the fibers toward the sidewalls of the enclosure where they drop and build up clumps.

It is to be understood that variations and modifications of the present invention may be made without departing from the spirit of the invention. It also is to be understood that the scope of the invention is not to be interpreted as limited to the specific embodiment disclosed herein but only in accordance with the appended claims, when read in the light of the foregoing disclosure.

What we claim is:

1. A method of separating glass fibers from glass fiber ends and rovings and distributing the fibers on a support to form a uniform, non-oriented layer, comprising the steps of:
    (a) cutting the rovings into relatively short lengths,
    (b) dropping the short lengths of rovings toward the support, and
    (c) reciprocating a plurality of relatively thin, taut, resilient elongated members through the path of the falling lengths of roving transversely of the direction of movement of the roving,
    (d) the elongated members being reciprocated transversely of the direction of their length.

2. A method as recited in claim 1, wherein the elongated members are arranged in vertically spaced horizontally disposed groups.

3. A method as recited in claim 2, wherein the elongated members in each group are parallel and spaced from each other.

4. A method as recited in claim 1, wherein the elongated members are stretched elastic bands.

5. In a method of separating glass fibers from glass fiber ends and rovings and distributing the fibers on a support to form a uniform, non-oriented layer, comprising the steps of
    (a) feeding the rovings to a cutting means,
    (b) cutting the rovings into relatively short lengths, and
    (c) permitting the short lengths of rovings to fall to the support,
the improvement comprising
    (d) striking the falling lengths of roving with a plurality of vertically spaced, relatively thin, taut, resilient elongated members moving substantially horizontally, (e) the elongated members being moved transversely of the direction of their length.

6. A method as recited in claim 5, wherein the elongated members are stretched elastic bands.

7. A method as recited in claim 6, wherein the elastic bands are comprised of neoprene.

8. Apparatus for separating glass fibers from glass fiber ends and rovings and distributing the fibers to form a uniform, non-oriented layer, comprising:
   (a) means for cutting continuous glass fiber rovings into relatively short lengths,
   (b) a frame located below the cutting means,
   (c) a plurality of horizontally disposed, relatively thin, taut resilient elongated members mounted on the frame,
   (d) a plurality of the elongated members being horizontally and vertically spaced from each other, and
   (e) means for moving the frame along a substantially horizontal path through the path of the falling lengths of roving.

9. Apparatus as rectied in claim 8, wherein the means for moving the frame reciprocates the frame.

10. Apparatus as recited in claim 8, wherein the elongated members are stretched elastic bands.

References Cited

UNITED STATES PATENTS

| 2,014,947 | 9/1935 | McCulloch et al. | 83—913 |
| 2,729,028 | 1/1956 | Slayter et al. | 83—913 |
| 3,164,047 | 1/1965 | Spicer et al. | 83—913 |

WILLIAM S. LAWSON, *Primary Examiner.*